(12) United States Patent
Schichtel

(10) Patent No.: US 12,522,096 B2
(45) Date of Patent: Jan. 13, 2026

(54) ENERGY SUPPLY SYSTEM

(71) Applicant: Kraftblock GmbH, Sulzbach (DE)

(72) Inventor: Martin Schichtel, Sulzbach (DE)

(73) Assignee: Kraftblock GmbH, Sulzbach (DE)

(*) Notice: Subject to any disclaimer, the term of this patent is extended or adjusted under 35 U.S.C. 154(b) by 1082 days.

(21) Appl. No.: 17/600,627

(22) PCT Filed: Apr. 1, 2020

(86) PCT No.: PCT/EP2020/059279
§ 371 (c)(1),
(2) Date: Jun. 27, 2022

(87) PCT Pub. No.: WO2020/201367
PCT Pub. Date: Oct. 8, 2020

(65) Prior Publication Data
US 2022/0324346 A1    Oct. 13, 2022

(30) Foreign Application Priority Data
Apr. 1, 2019    (DE) .................. 10 2019 108 392.3

(51) Int. Cl.
*H02J 7/00*    (2006.01)
*B60L 53/50*    (2019.01)
(Continued)

(52) U.S. Cl.
CPC ............. *B60L 53/50* (2019.02); *B60L 53/52* (2019.02); *H02N 11/002* (2013.01)

(58) Field of Classification Search
CPC ................................ B60L 53/50; B60L 53/52
(Continued)

(56) References Cited

U.S. PATENT DOCUMENTS 5,384,489 A    1/1995  Bellac
6,380,637 B1 * 4/2002  Hsu .................. B60L 58/34
                                              290/1 R
(Continued)

FOREIGN PATENT DOCUMENTS

CN    106026296 A    10/2016
CN    206195367 U     5/2017
(Continued)

OTHER PUBLICATIONS

Dr. Martin Schichtel, "Einsatz und Nutzungsmöglichkeiten von HTES," Oct. 24, 2017, XP055687204.
(Continued)

*Primary Examiner* — Alexis B Pacheco
(74) *Attorney, Agent, or Firm* — Westborough IP Group, LLC

(57) ABSTRACT

A heat accumulator is charged with thermal energy in a heat charging station and the thermal energy is converted into electrical energy in a conversion station, which may be in a separate location from the heat charging station. An energy supply system has at least one heat accumulator and a heat charging station that charges the heat accumulator with thermal energy. The energy supply system has a conversion station for converting the thermal energy stored in the heat accumulator into electrical energy. An energy generating device generates electrical energy that is converted into thermal energy and stored in the heat accumulator.

21 Claims, 1 Drawing Sheet

(51) Int. Cl.
    *B60L 53/52*     (2019.01)
    *H02J 7/14*     (2006.01)
    *H02N 11/00*     (2006.01)

(58) Field of Classification Search
    USPC .......................................................... 320/101
    See application file for complete search history.

(56) References Cited

U.S. PATENT DOCUMENTS

| | | | |
|---|---|---|---|
| 10,988,654 | B2 | 4/2021 | Schichtel |
| 2004/0142733 | A1* | 7/2004 | Parise ................... B60L 53/11 455/572 |
| 2007/0029065 | A1 | 2/2007 | Takahashi et al. |
| 2011/0282807 | A1 | 11/2011 | Colello et al. |
| 2011/0309786 | A1* | 12/2011 | Hassan ................. F03D 3/0427 290/55 |
| 2012/0153874 | A1* | 6/2012 | Lachenmeier ........ B60W 10/08 318/140 |
| 2012/0206093 | A1* | 8/2012 | Schaefer ............. H01M 10/663 320/137 |
| 2014/0074314 | A1 | 3/2014 | Niknafs et al. |
| 2014/0292260 | A1* | 10/2014 | Dyer ...................... B60L 53/65 320/137 |
| 2014/0327304 | A1 | 11/2014 | Markowz et al. |
| 2015/0001944 | A1 | 1/2015 | Markowz et al. |
| 2015/0219404 | A1* | 8/2015 | Pietsch .................... B60L 7/06 165/10 |
| 2016/0146507 | A1* | 5/2016 | Johnson ................ F24S 50/20 126/714 |
| 2016/0226042 | A1* | 8/2016 | Hartmann ........... H01M 50/213 |
| 2019/0010374 | A1 | 1/2019 | Schichtel |
| 2019/0190306 | A1* | 6/2019 | Sosinov ................... H02J 7/14 |
| 2019/0344670 | A1* | 11/2019 | Mattmuller ............ B60L 50/90 |
| 2020/0299189 | A1 | 9/2020 | Rocktäschel |

FOREIGN PATENT DOCUMENTS

| | | |
|---|---|---|
| DE | 252 664 A1 | 12/1987 |
| DE | 10 2006 035 759 A1 | 2/2008 |
| DE | 10 2006 045 611 A1 | 4/2008 |
| DE | 10 2009 010 358 A1 | 7/2010 |
| DE | 10 2010 041 919 A1 | 4/2012 |
| DE | 10 2012 201 872 A1 | 8/2013 |
| EP | 2 738 384 A2 | 6/2014 |
| EP | 3 187 563 A1 | 7/2017 |
| FR | 2 511 210 A1 | 2/1983 |
| JP | 03253278 | 11/2001 |
| JP | 2007-040645 A | 2/2007 |
| JP | 2012-505629 A | 3/2012 |
| JP | 2013 134033 A | 7/2013 |
| JP | 2017-186982 A | 10/2017 |
| JP | 2018-061432 A | 4/2018 |
| JP | 2019-508567 A | 3/2019 |
| WO | WO 2010/042659 A1 | 4/2010 |
| WO | WO 2010/102953 A1 | 9/2010 |
| WO | WO 2013/068244 A2 | 5/2013 |
| WO | WO 2013/068249 A2 | 5/2013 |
| WO | WO 2016/051053 A1 | 4/2016 |
| WO | WO 2016/081944 A1 | 5/2016 |
| WO | WO 2017/046275 A1 | 3/2017 |
| WO | WO 2017/118493 A1 | 7/2017 |
| WO | WO 2017/157664 A1 | 9/2017 |
| WO | WO 2018/020411 A1 | 2/2018 |
| WO | WO 2019/198797 A1 | 10/2019 |

OTHER PUBLICATIONS

Wikipedia, "Latent heat storage," 2017.
Wikipedia, "Thermochemical heat accumulator," Nov. 2016.
Dr. Christian Stiewe, et al, "Application potential of thermoelectric generators in stationary systems," Opportunities for NRW, https://www.energie-lexikon.info/thermoelektrischer_generator.html.
"Thermoelectric generator," https://www.energielexikon.info/thermoelektrischer_generator.html.
"Thermoelectric generator is smaller than a sugar cube," KIT EXCERPT Apr. 25, 2018.
Chinese Office Action for Application No. 2020800357953, Dated Dec. 27, 2023.
Japanese Office Action for Application No. 2021-558746, Dated Dec. 26, 2023.
Dr. Martin Schichtel, "Use and Potential Uses of HTES,", NEBUMA GMBH, Oct. 24, 2017, XP055687204, English Translation.
EPO Office Action (with machine translation) dated Apr. 1, 2025, for EPO Application No. 20716768.5.

* cited by examiner

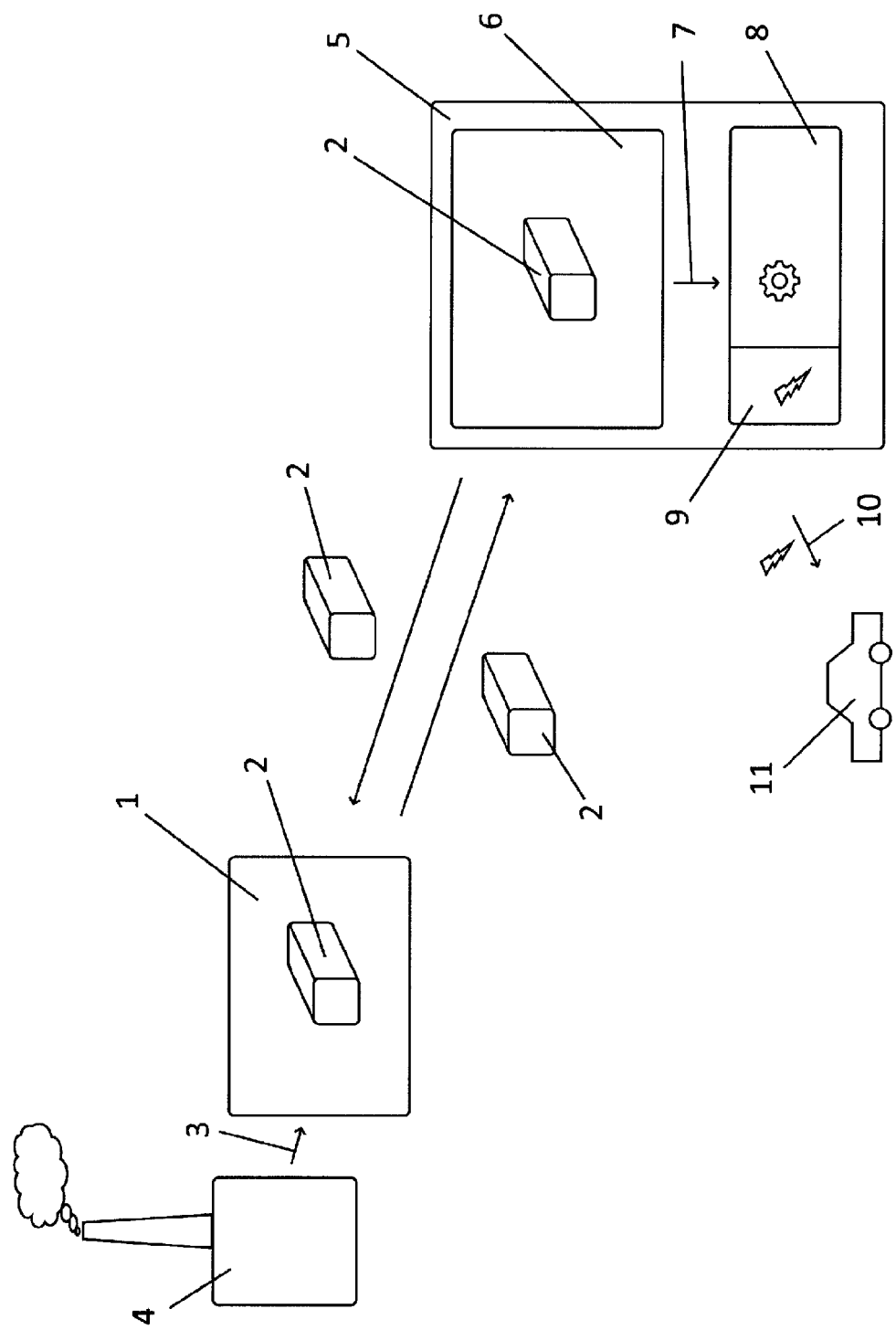

ENERGY SUPPLY SYSTEM

TECHNICAL FIELD

The system described herein relates to supplying electrical energy and a system for supplying electrical energy.

BACKGROUND

There are systems and methods to provide electrical energy at a specific location and/or at a specific time. On principle, the supply of electrical energy is not a problem in civilized areas. In industrial nations, in particular, there are widely branched electrical supply networks that are regularly able to guarantee sufficient supply across different areas. Nevertheless, there is regularly the need to provide electrical energy independently of existing networks for the transmission of electrical energy at certain locations. For example, it is possible that the provision of electrical energy by means of the construction of new networks at a location that is insufficiently developed with existing networks would be uneconomical.

Furthermore, renewable energies, rising raw material prices and increased demands on climate protection are increasingly placing more stringent conditions on the local provision of electrical energy and the resilience and reliability of the networks.

One aspect in this context is electromobility. In the future, electric vehicles will need a comparatively dense network of charging stations. This must also cover remote regions and/or regions that are not or are only inadequately supplied with current electrical networks. Due to the limited range of electric vehicles compared to combustion engines, the network of charging stations should be correspondingly dense.

Another aspect is the increasing use of renewable energies, which depend on suitable environmental conditions. These include, for example, wind power and solar energy. Depending on their current ability to generate energy and the current energy demand of the consumers supplied, additional electrical energy must be made available or dissipated through supply networks, possibly over long distances.

Furthermore, there is an increasing desire to use any form of generated and/or accruing energy. The poor storage capacity of electrical energy, on the one hand, and the lack of networks comparable to electrical energy supply networks for other forms of energy currently still limit the implementation of this desire for extensive use of energy resources. For example, district heating networks for transporting thermal energy are known, but the operation of such networks only makes sense where a large number of consumers can be supplied from a correspondingly powerful source in a comparatively small space. Thermal energy is usually only used for heating purposes, so that only a limited and often only seasonally fluctuating benefit is achieved, especially during the heating season.

For example, patent document DD 252 664 A1 discloses a heat supply system in which thermal energy can be transported to decentralized consumers via mobile heat accumulators that are filled with a thermal energy storage medium. For this purpose, the thermal energy accumulators are charged with unused thermal energy, for example thermal energy that accrues as part of an energy related process, and is then transported to a consumer where the energy accumulator is discharged. However, this is only a system for supplying thermal energy, not a system for supplying electrical energy.

FR 25 112 10 A1 relates to a power plant with a multi-stage turbine arrangement. Here, the residual heat from individual turbine stages is temporarily stored and, if necessary, used in other turbine stages. Although this results in a higher efficiency than conventional power plants with multi-stage turbine arrangements, the utilization of the residual heat is only possible at the place of its generation.

CN 206195367 U and CN 106026296 A disclose mobile gas storage units that can be transported on a truck. The gas can be burned and converted into electrical energy via a generator. The electrical energy can be temporarily stored in a battery. The resulting heat can be used in a heat accumulator to produce warm water. Such a system enables a decentralized supply of electrical energy, but the use of waste heat to generate hot water implemented therein only represents a low added energy value compared to the use of conventional mobile power generation devices. Basically, this is just a type of mobile combined heat and power unit.

JP 2013 134033 A discloses a system in which the waste heat from a charging station is used for an electric motor vehicle. The waste heat generated when the vehicle is being charged at the charging station is either used directly for heating and/or hot water supply to a building, or is initially stored in a heat accumulator. However, the system only provides thermal energy; the supply of electrical energy must be provided in some other way.

JP 03253278 A discloses a possibility of using waste heat initially to generate magnetic fields and, in a further step, to generate electrical energy. However, it does not disclose a decentralized supply of electrical energy.

SUMMARY OF THE INVENTION

It is desirable to provide electrical energy in a way which, on the one hand, has high flexibility with regard to the supply location and/or the supply time of the electrical energy, and on the other hand, has high efficiency with regard to the consumption of primary energy carriers and the climate impact.

The method according to the system described herein provides that a heat accumulator is charged with thermal energy in a heat charging station. The thermal energy is converted into electrical energy in a conversion station. In particular, the system described herein provides that the heat accumulator in the heat charging station is charged with thermal energy at a first location. The heat accumulator charged with thermal energy is transported to a second location that is different from the first location. At the second location, the thermal energy is converted into electrical energy in the conversion station.

The system described herein achieves two goals in particular: on the one hand, the thermal energy with which the heat accumulator is charged at the first location can be utilized. On the other hand, electrical energy can be provided at the second location independently of existing supply networks.

The energy supply system for supplying electrical energy is used, in particular, to provide the system described herein. The energy supply system has a heat charging station for charging a heat accumulator with thermal energy. The energy supply system also has at least one transportable heat accumulator. The energy supply system according to the system described herein further has a conversion station for converting the thermal energy stored in the heat accumulator into electrical energy. The system has an energy generating device for generating electrical energy and is designed to convert electrical energy generated by the energy generating device into thermal energy and to store the thermal energy in the heat accumulator. Such a system decouples the consumption of the electrical energy generated by the energy generating device in terms of time by temporarily storing energy corresponding to the electrical energy in the heat accumulator. In particular, when the energy supply system is connected to an electrical energy supply network, the energy stored in the heat accumulator can be used to provide control power, in particular to provide secondary control power.

The energy generating device can be an energy generating device for generating electrical energy from renewable energies, such as a wind turbine.

The heat charging station can be located at the first location at which, in particular, the energy generating device is also located. The conversion station can also be located at the first location and/or at a second location that is different from the first location. In the former case, stationary heat accumulators can also be used instead of the transportable heat accumulators. In this case, the system is used in particular for the time-independent provision of electrical energy and/or thermal energy. In the second case, it is possible to charge the heat accumulator at the first location with heat energy and, after the heat accumulator has been transported to the second location, convert the stored thermal energy, at least in part, into electrical energy and thus provide it at the second location.

The discharged heat accumulators can be, in the case of using transportable heat accumulators, transported back to the first location and recharged. The discharged heat accumulators can also be moved to another location, charged there, and thus continued to be used. Depending on the current demand for heat accumulators and/or accruing, storable energy, the most favourable transport routes can be selected in each case in order to make discharged energy accumulators available for recharging. The heat accumulators may still have a certain residual temperature after the heat accumulators have been discharged. Thermal energy stored in the heat accumulators associated with the residual temperature is not lost, or at least only to a minor extent, but remains until the beginning of the renewed charging of the heat accumulator—a "preheating", as it were. Also, for example, thermal energy from an energy conversion process for generating electrical energy, which can no longer be used for generating electrical energy, can be used to preheat a heat accumulator. This thermal energy can, for example, be the residual heat of a turbine.

In this context, "two different locations" may be understood as meaning, in particular, two locations that are more than 1 km, preferably more than 10 km, away from one another.

The system described herein is particularly advantageous in connection with the supply of electrically powered vehicles with electrical energy. Electrically powered vehicles have accumulators with a comparatively limited range. Therefore, even in structurally weak regions, there should be a comprehensive network of charging stations that is able to provide a certain amount of electrical power.

In the system described herein, conversion stations can be used to charge accumulators in electrically powered vehicles. The supply of the conversion stations, which are coupled with charging stations for the electric vehicles, can thus take place in particular in a simple manner by transporting the heat accumulators. This enables a supply that is similar in terms of flexibility to the supply of conventional filling stations with tankers. Such a supply is particularly advantageous in regions with a demand that changes depending on the season—for example, when there is seasonal traffic during a holiday season. A permanently installed energy supply network would have to be designed based on a peak value that is only required at times. With the system described herein, it is possible to transport heat accumulators that are more or less frequently charged with thermal energy to the conversion station. In this way, it is possible to react very flexibly to the respective needs.

In addition to the supply of electric vehicles, there are further particularly advantageous areas of application for the system described herein with regard to advantageous installation locations of conversion stations. For example, remote infrastructures can easily be supplied with electrical energy and/or thermal energy in a self-sufficient manner. The remote infrastructures can be remote farms, for example. But also, the remote infrastructures can be other types of facilities, for example those used for leisure and/or tourism, represent advantageous fields of application. For example, catering facilities can be operated in remote regions and, according to the system described herein, supplied with electrical energy and/or thermal energy. The system described herein is similarly advantageous in connection with the supply, for example, of quarters, a campus, a commercial property, a street, a town, a camp and/or a crisis area with electrical energy and/or thermal energy.

A particular advantage of the system described herein comes into play in cases of only seasonal or temporary utilization of the supplied facility. At peak times, a facility can be supplied with charged heat accumulators at an increased frequency. In times of low utilization or a temporary or seasonal shutdown of the facility, the supply can be reduced to a minimum or even completely stopped.

It is possible to use the system described herein for supplementary energy supply. A conversion station can then be provided on a facility to be supplied with electrical energy, in particular to cover demand peaks. In such application situations, an existing supply from a power grid can be drawn on as a supplement. This is particularly useful if there is a connection of the facility to be supplied to an electrical power supply network, but the performance of this connection is insufficient.

Alternatively, it is possible to use the system described herein to provide a network-independent energy supply. This is especially useful in cases where there is no connection to an existing power supply network. This can be the case in particular when the facility to be supplied is newly built, in particular in a remote area. In this context, the system described herein is particularly useful where a facility is only set up temporarily, for example for organizing a single event. In such cases, use is often made of mobile power generators generating electrical energy by burning fossil fuels. Using a mobile and/or transportable conversion station, the system described herein can replace such conventional mobile and/or transportable generators. The system described herein excels in particular by the fact that the nuisance inevitably caused by the conventional generators due to exhaust gases and/or engine noise is avoided.

The conversion of the thermal energy into electrical energy can take place, for to example, with a steam turbine and/or in a steam engine. The use of a steam turbine and/or a steam engine is particularly advantageous when the thermal energy is stored in the heat accumulator at a comparatively high temperature level. Alternatively and/or in addition, a Stirling engine can also be used to convert electrical energy into thermal energy.

The processes that can advantageously be used for converting the thermal energy into electrical energy in the context of the system described herein can be based, for example, on a Clausius-Rankine process or a Carnot process. This includes, for example, the operation of a steam turbine and/or a steam engine as part of a Steam Rankine Cycle (SRC).

Alternatively and/or in addition, it is possible for the thermal energy to be converted into electrical energy by a so-called Organic Rankine Cycle (ORC). This is a process that uses an organic medium instead of water vapor to operate a steam turbine and/or a steam engine. The boiling point of the organic medium at normal pressure is preferably below that of water. This is particularly advantageous in connection with the use of heat accumulators that operate at a low and/or medium temperature level.

Another advantageous variant for converting thermal energy into electrical energy within the scope of the system described herein is the use of a Kalina process in the conversion station. In these processes, a mixture of ammonia and water is used to generate steam, wherein additional benefit is obtained from thermodynamic effects resulting from the changes in the concentration of ammonia or water in the individual phases. With such a process, higher efficiencies can be achieved under suitable boundary conditions.

Alternatively and/or in addition, there is the possibility of feeding the thermal energy into a conventional power plant for generating electrical energy. This can be a gas and steam turbine power plant, for example. The power plant then acts as a conversion station. The added value of the system described herein lies in this case in particular in the utilization of waste heat used.

Alternatively and/or in addition, the conversion station can have a thermoelectric generator. A thermoelectric generator or thermogenerator is understood to be a device based on semiconductors that converts thermal energy into electrical energy. The thermoelectric effect used here is also referred to as the Seebeck effect. Alternatively and/or as a component of a thermoelectric generator, a thermoelectric material can be used to convert the thermal energy into electrical energy.

It is also possible that at least part of the thermal energy stored in the heat accumulator is used directly, for example for heating purposes and/or for hot water preparation. In this way, the conversion station can be operated in the manner of a thermal power station. When supplying energy to remote facilities with the method according to the system described herein, a higher overall efficiency can possibly be achieved in this way than is the case with purely electrical use. This is due to the fact that when heat is used directly, lower temperature levels can usually be used more sensibly than when converting thermal energy into electrical energy.

In an advantageous manner, the thermal energy with which the heat accumulator is charged can be waste heat. In this context, waste heat is, in particular, to be understood to be heat usually not put to any value-adding use according to the state of the art. Such waste heat occurs, in particular, in industrial facilities of any type. This applies, in particular, to those industrial facilities in which materials and/or workpieces are temporarily brought to high temperatures, for example in order to enable primary and/or transformation processes and/or chemical conversions. Examples include facilities in heavy industry, the ceramics industry, the glass industry, the chemical industry and/or the pharmaceutical industry.

Alternatively and/or in addition, the thermal energy can be thermal energy that originates from exhaust gases, in particular from flue gases. The thermal energy obtained from flue gases can in particular, at least in part, already be obtained from the flue gases before the flue gases are subjected to a flue gas cleaning process.

In the context of the method according to the system described herein, a thermal energy storing medium is preferably heated to an average temperature of at least 200° C., particularly preferably at least 300° C., and/or at most 1,300° C., preferably at most 650° C., when the heat accumulator is charged with thermal energy. It has been shown that these temperature ranges can be used particularly effectively in practice. On the one hand, heat accumulators, the heat storage media of which have a corresponding temperature, represent a sufficiently hot energy source to enable an economical conversion process of the thermal energy into electrical energy. On the other hand, waste heat flows occur at the above-mentioned temperature levels in sufficient quantities to enable the operation of corresponding heat charging stations and heat accumulators.

In particular, so-called latent heat accumulators can be used as heat accumulators. Phase change materials are used as heat storage media in such heat accumulators. The latent heat of fusion, heat of solution and/or heat of absorption of such media is significantly greater than the heat that could be stored without using such phase change effects.

Alternatively and/or in addition, so-called sensible heat accumulators can be used. Such heat accumulators change their sensible temperature during charging and/or discharging. In particular, there are no phase transitions in such heat accumulators. Sensible heat accumulators are particularly well suited to enable broad and/or high temperature ranges. Such heat accumulators are described, for example, in EP 3 187 563 A1.

The heat storage medium can include solid core particles and at least one phosphorus compound. At least part of the phosphorus compound is an oligomer. The core particles here include a shell which includes phosphorus compounds bound to the core particles by chemisorption or physisorption. Such a heat storage medium further includes matrix phosphorus compounds. At least some of the shell phosphorus compounds and/or the matrix phosphorus compounds are oligomers. The solids content of such a heat storage medium can be in a range from 30% to 60% by weight. The average diameter of the core particles of such a heat storage medium can be in a range from 1 to 10 μm. The surface of the core particles of such a heat storage medium can be pretreated with a reactive species. The at least one oligomer of such a heat storage medium can contain 3 to 50 repeating units. The water of crystallization content in the at least one phosphorus compound of such a heat storage medium can be in a range from 0% to 20% by weight. The at least one oligomer of the shell phosphorus compound of such a heat storage medium can have fewer repeating units than the oligomer of the matrix phosphorus compound. The composition of such a heat storage medium can also include fillers. The average diameter of the filler particles of such a heat storage medium can be in the range from 1 to 50 mm. Such a heat storage medium can be flowable and most preferably liquid. Such a heat storage medium can be hardened. In the case of such a hardened heat storage medium, at least 90% by weight of the water may have been removed. Such a heat storage medium can be produced by the at least one phosphorus compound containing at least one oligomer having been mixed with the solid core particles.

Alternatively and/or in addition, the heat accumulator can be a part of a power plant converted into a heat accumulator. In particular, the combustion chambers of power plants can be filled with heat storage materials and/or replaced by thermal accumulators in order to provide heat accumulators with high capacity in a cost-effective manner.

Alternatively and/or in addition, so-called thermochemical heat accumulators may be used. Thermochemical heat accumulators use, for example, silica gels that absorb water vapor as a thermal energy storage medium. Alternatively and/or in addition, for example, metal hydrides and/or zeolites can also be used as thermal energy storage media in such heat accumulators. However, other reversible chemical processes or reactions also come into consideration.

It is advantageous if the heat accumulator is compatible with a transport system for freight containers. In this way, existing logistical systems can be used to transport the heat accumulators. It is particularly advantageous if the heat accumulators are designed to be compatible with TEU-ISO containers and/or FEO-ISO containers. This applies in particular to the dimensions of the heat accumulators and the shape and attachment points of the heat accumulators that can be used for container logistics systems, in particular at the corners of the container-shaped heat accumulators. Such heat accumulators can then be treated and/or handled logistically like containers. It is advantageous if such heat accumulators have a support structure. The support structure can in particular be arranged in the interior of the heat accumulator. Such a support structure serves in particular to absorb the static forces generated by the weight of the thermal energy storage medium. Due to the changing temperatures in the heat accumulator, the materials of the heat accumulator are additionally stressed. The thermal and mechanical loads can lead to interactions in the materials, in which the individual effects that load the materials reinforce one another. In this context, thermal ratcheting is possible and needs to be considered.

The support structure can in particular be designed in such a way that the areas of the corners and/or attachment points of the container are reinforced. Without such a support structure, when using a standard container, there is a risk that, due to the maximum load-bearing capacity of the container, the volume of the container cannot be fully used for filling with heat storage medium because a complete filling would exceed the maximum load-bearing capacity of the container.

It is advantageous if thermal insulation is provided between the thermal energy storage medium and the support structure.

The system described herein may use a plurality of heat accumulators. The number of heat accumulators may be so high that continuous operation of the heat charging station and/or the conversion station is made possible. Continuous operation of the heat charging station has the advantage that a heat flow, which may also be continuously occurring, can be used permanently to charge heat accumulators. This means that, for example, a waste heat flow can be used continuously. Continuous use of the conversion station is useful, for example, if a readiness for supply of energy "around the clock" is to be maintained within the scope of supplying vehicles with electrical energy. In this case, it is advantageous that at least one of the heat accumulators, which still contains at least a sufficient amount of residual heat energy to ensure security of supply, is located in the conversion station. Further heat accumulators can be located, at the same time, in transit and/or in the heat charging station to enable continuous operation of the conversion station, in particular by replacing a heat accumulator in a timely fashion.

In addition, if the system uses a plurality of heat accumulators, selective use of the heat accumulators for the provision of electrical energy and/or for the provision of thermal energy depending on the temperature of the respective heat accumulator is possible. In other words, this means that, for example, the thermal energy in a first heat accumulator, which in particular has a comparatively high temperature level, is used to generate electrical energy that is fed into an electrical supply network, for example, while the thermal energy in a second heat accumulator, which has a lower temperature level than the first heat accumulator, is used to provide thermal energy, for example via a heat distribution network.

In addition, it is also possible that the system described herein uses a plurality, in particular a large number, of heat accumulators, a plurality, in particular a large number, of heat charging stations and/or a plurality, in particular a large number, of conversion stations. In this way, a supply network can be formed in which the transfer of electrical energy and/or thermal energy via corresponding networks and/or the transport times and/or transport routes between individual heat charging stations and conversion stations are determined, in particular depending on the respective demand for electrical energy at the conversion stations and/or the occurrence of thermal energy at the heat charging stations. Such a supply network can fulfil the function of a district heating network or, in other words, forms a kind of virtual district heating network. It is useful to optimize the transport routes to be covered with regard to the shortest possible routes and thus the most energy-saving transport of the heat accumulators. This can be done, for example, by a higher-level controller. The higher-level controller can, in particular, record and/or evaluate operating data of the heat charging station, the conversion station and/or the heat accumulator. In particular, the controller can also be used to plan and/or coordinate logistical measures that are carried out independently of the direct influence of the controller, such as the transport of heat accumulators, e.g. by truck.

The operating data can be the heat flows and/or quantities occurring at the heat charging stations, the electrical energy demand and/or the power demand at the conversion stations and/or the respective position and/or the state of charge of the individual heat accumulators. The operating data can then preferably be used as a basis for the determination and/or calculation of optimized transfers of electrical energy and/or thermal energy in and/or via corresponding networks and/or transport routes and/or transport times for the individual accumulators.

The higher-level controller can be implemented using a computer, for example, that can be connected to the heat charging station, the conversion station and/or the heat accumulator, for example by means of a data connection via the internet and/or a cellular network. To determine a current location, the heat accumulator can advantageously be equipped with a GPS receiver. The heat charging station, the conversion station and/or the heat accumulator preferably has a suitable measuring device and/or a sensor in order to record the respective operating data.

In this context, the higher-level controller can also be used to extrapolate to future expected demand data based on operating data collected in the past. This is particularly useful if the accumulation of thermal energy at a heat charging station and/or the demand for electrical energy at a conversion station is subject to fixed time cycles. The higher-level logistic controller can preferably recognize such cycles on the basis of collected operating data. The cycles can arise, for example, on the basis of weekly, daily and/or seasonal fluctuations in the demand for electrical energy and/or the occurrence of thermal energy. The higher-level logistic controller can then take such cycles into account when evaluating the operating data and calculating or determining the transport times and/or the transport routes based thereon. This enables "predictive" control of the system according to the system described herein.

It is possible that the system and/or the controller controlling the system is designed to convert electrical energy into thermal energy and to store the thermal energy and/or to convert stored thermal energy into electrical energy and release the electrical energy to the power supply network, depending on the power generated by the energy supply device and/or the demand for electrical energy of a network supplied with electrical energy by the energy generating device. In this way, in particular the use of the system described herein for the provision of control power can be promoted. In this context, in particular, networking for the transmission of data of the system with other devices of an electrical power supply network can take place. This can in particular make it possible to obtain data relating to the current demand and/or the current price of electrical energy and to use the data as a basis for the control of the system described herein.

According to a practical embodiment, the system described herein is used to supply electrically powered vehicles with electrical energy. An exemplary conversion station should be able to be used to charge 80 vehicles with 100 kWh of electrical energy each. This is based on 250 operating days per year, which corresponds to a total of 2 GWh of electrical energy per year.

With an underlying efficiency of 15% in the conversion of thermal energy into electrical energy, this means that 56 MWh of thermal energy per day is transported from a heat charging station to the conversion station or is made available at same. With the system described herein, the thermal energy can, for example, be provided by the daily supply of the conversion station with 3 heat accumulators, the dimensions of which correspond to 20-foot containers (TEU-ISO containers). In order to ensure that the conversion station is continuously ready for operation, in such a case, six corresponding heat accumulators, which are simultaneously in operation, are sufficient. The investment for such a system is approximately 30% of the costs that would have to be raised for a similarly powerful solar system as an alternative to the system described herein at the location of the conversion station.

BRIEF DESCRIPTION OF DRAWINGS

FIG. 1 shows a simplified process diagram of an exemplary method for supplying electrical energy according to the system described herein.

DESCRIPTION OF VARIOUS EMBODIMENTS

The exemplary method for supplying electrical energy is based on a heat charging station 1 that is located at a first location. In the heat charging station 1, heat accumulators 2 can be charged with thermal energy.

The heat accumulators 2 can, for example, be structures which, in terms of their dimensions, correspond to TEU-ISO containers. In this way, the heat accumulators 2 can be transported in an uncomplicated manner with a transport system for such containers.

The heat accumulators 2 can be latent heat accumulators. The heat accumulators 2 can have a heat storage medium which, when the heat accumulator 2 is charged in the charging station 1, reaches an average temperature of 650° C. Thermal energy 7 with which the heat accumulator 2 is charged can be waste heat 3 from an industrial facility 4.

The heat accumulators 2 charged in this way can then, as shown schematically in FIG. 1, be transported to a conversion station 5. There, the heat accumulators 2 can be discharged with a discharging device 6. The thermal energy 7 from the heat accumulators 2 is first fed in the conversion station 5 to a heat engine 8, for example a steam engine or a Stirling engine. The latter is coupled to a generator 9.

Electrical energy 10 generated in this way by the generator 9 can be used, for example, to charge electrically powered vehicles 11. After being discharged, the discharged heat accumulators 2 can be transported from the conversion station 5 back to the heat charging station 1 and charged again.

The features of the invention disclosed in the present description, in the drawings and in the claims can be essential individually or in any desired combinations for realizing the invention in its various embodiments. The invention is not restricted to the embodiments described. It can be varied within the scope of the claims and taking into account the knowledge of the competent person skilled in the art.

The invention claimed is:

1. A method for the supply of electrical energy, comprising:
charging a heat accumulator in a heat charging station at a first location with thermal energy, the heat accumulator having a thermal energy storage medium;
transporting the heat charging station to a second location different from the first location; and
converting the thermal energy into electrical energy in a conversion station at the second location, wherein the thermal energy storage medium includes solid core particles and at least one phosphorus compound, wherein at least part of the phosphorus compound is an oligomer, wherein the thermal energy storage medium includes core particles with a shell, wherein the shell includes shell-phosphorus compounds which are bound to the core particles by chemisorption or physisorption, wherein the thermal energy storage medium includes matrix phosphorus compounds, at least some of the shell phosphorus compounds and/or the matrix phosphorus compounds being oligomers.

2. The method according to claim 1, wherein the electrical energy is used for supplying electrically powered vehicles with electrical energy.

3. The method according to claim 1, wherein the conversion of the thermal energy into electrical energy uses at least one of: a steam turbine, a Stirling engine, a thermoelectric material, a thermoelectric generator, a Kalina process, an organic Rankine cycle process, or a steam Rankine cycle process.

4. The method according to claim 1, wherein the thermal energy with which the heat accumulator is charged is waste heat.

5. The method according to claim 1, wherein when charging the heat accumulator with thermal energy, the thermal energy storage medium of the heat accumulator reaches an average temperature of at least 200° C and/or at most 1,300° C.

6. The method according to claim 1, wherein operating data of the heat charging station, the conversion station and/or the heat accumulator are recorded and evaluated by a higher-level logistical controller and transport routes and/or transport times of the heat accumulator are calculated and/or determined on the basis of the operating data.

7. The method according to claim 1, wherein the heat accumulator is compatible with a transport system for freight containers.

8. The method according to claim 1, wherein the heat accumulator is a latent heat accumulator.

9. The method according to claim 1, wherein the heat accumulator is a sensible heat accumulator.

10. The method according to claim 1, wherein a plurality of heat accumulators form a supply network that provides a district heating network.

11. The method according to claim 1, wherein part of the thermal energy stored in the heat accumulator is released to a heat supply network.

12. Energy supply system for supplying electrical energy, comprising:
  at least one heat accumulator having a thermal energy storage medium;
  a heat charging station that charges the heat accumulator with thermal energy;
  a conversion station that converts the thermal energy stored in the heat accumulator into electrical energy; and
  an energy generating device that generates electrical energy that is converted into thermal energy and stored in the heat accumulator, wherein the thermal energy storage medium includes solid core particles and at least one phosphorus compound, wherein at least part of the phosphorus compound is an oligomer, wherein the thermal energy storage medium includes core particles with a shell, wherein the shell includes shell-phosphorus compounds which are bound to the core particles by chemisorption or physisorption, wherein the thermal energy storage medium includes matrix phosphorus compounds, at least some of the shell phosphorus compounds and/or the matrix phosphorus compounds being oligomers.

13. System according to claim 12, wherein the energy generating device generates the electrical energy from renewable energies.

14. System according to claim 12, wherein the thermal energy is stored and/or converted into electrical energy and released to an energy supply network, depending on power generated by the energy supply device and/or a demand for electrical energy of the energy supply network.

15. The method according to claim 2, wherein the electrical energy is used for charging accumulators of electrically powered vehicles.

16. The method according to claim 3, wherein the thermal energy with which the heat accumulator is charged is waste heat from an industrial facility.

17. The method according to claim 4, wherein when charging the heat accumulator with thermal energy, the thermal energy storage medium of the heat accumulator reaches an average temperature of at least 300° C., and/or at most 650° C.

18. The method according to claim 7, wherein the heat accumulator is compatible with TEU-ISO containers and/or FEU-ISO containers.

19. The method according to claim 7, wherein the heat accumulator has an inner support structure.

20. The method according to claim 8, wherein the heat accumulator is a thermochemical heat accumulator.

21. System according to claim 13, wherein the energy generating device generates the electrical energy from a wind turbine.

* * * * *